(12) United States Patent
Perell et al.

(10) Patent No.: US 8,590,282 B2
(45) Date of Patent: Nov. 26, 2013

(54) PACKAGE WITH UNIQUE OPENING DEVICE AND METHOD FOR OPENING PACKAGE

(75) Inventors: William S. Perell, San Francisco, CA (US); Leif B. Sorensen, Cape Canaveral, FL (US); Irving S. Rappaport, Palo Alto, CA (US)

(73) Assignee: Poppack, LLC, San Francisco, CA (US)

( * ) Notice: Subject to any disclaimer, the term of this patent is extended or adjusted under 35 U.S.C. 154(b) by 410 days.

(21) Appl. No.: 12/912,089

(22) Filed: Oct. 26, 2010

(65) Prior Publication Data

US 2011/0036056 A1  Feb. 17, 2011

Related U.S. Application Data

(60) Continuation-in-part of application No. 12/695,691, filed on Jan. 28, 2010, which is a division of application No. 12/184,809, filed on Aug. 1, 2008, now Pat. No. Re. 41,273, which is an application for the reissue of Pat. No. 7,306,371, which is a continuation-in-part of application No. 10/831,964, filed on Apr. 26, 2004, now Pat. No. 6,938,394, which is a continuation-in-part of application No. 10/246,893, filed on Sep. 19, 2002, now Pat. No. 6,726,364.

(60) Provisional application No. 61/332,420, filed on May 7, 2010.

(51) Int. Cl.
*B65B 43/26* (2006.01)

(52) U.S. Cl.
USPC ............ 53/492; 53/133.1; 53/133.3; 493/212

(58) Field of Classification Search
USPC ............... 53/457, 492, 133.1, 133.3; 493/212
See application file for complete search history.

(56) References Cited

U.S. PATENT DOCUMENTS 2,916,886 A   12/1959  Robbins
3,074,544 A    1/1963  Bollmeier et al.
(Continued)

FOREIGN PATENT DOCUMENTS

DE   20314741         1/2004
EP   00306207 A1      3/1989
(Continued)

OTHER PUBLICATIONS

U.S. Appl. No. 12/434,254, filed May 1, 2009, Package with one or More Access Points for Breaking one or more Seals and Accessing the Contents of the Package.

(Continued)

*Primary Examiner* — Christopher Harmon
(74) *Attorney, Agent, or Firm* — Dority & Manning, P.A.

(57) ABSTRACT

A package and method for opening the package are disclosed. The method may include applying pressure to at least one tab area of the package. The at least one tab area may include a first tab portion and a second tab portion, the first tab portion and the second tab portion being disposed in a first position substantially sealed from each other. The method may further include breaching a first breachable bubble, the first breachable bubble being formed within the first tab portion, and breaching a second breachable bubble, the second breachable bubble being formed within the second tab portion. Further, the method may include causing the first tab portion and the second tab portion to shift from the first position to a second position in fluid communication with each other.

17 Claims, 7 Drawing Sheets

(56) References Cited

U.S. PATENT DOCUMENTS

| | | | |
|---|---|---|---|
| 3,120,336 | A | 2/1964 | Whatley, Jr. |
| 3,189,227 | A | 6/1965 | Hobbs et al. |
| 3,256,981 | A | 6/1966 | Kurtz |
| 3,294,227 | A | 12/1966 | Schneider et al. |
| 3,301,390 | A | 1/1967 | Via, Jr. |
| 3,342,326 | A | 9/1967 | Zackheim |
| 3,419,137 | A | 12/1968 | Walck, III |
| 3,478,871 | A | 11/1969 | Sager |
| 3,573,069 | A | 3/1971 | Keller et al. |
| 3,608,709 | A | 9/1971 | Pike |
| 3,635,376 | A | 1/1972 | Hellstrom |
| 3,749,620 | A * | 7/1973 | Montgomery .............. 156/73.1 |
| 3,847,279 | A | 11/1974 | Montgomery |
| 3,921,805 | A | 11/1975 | Compere |
| 3,964,604 | A | 6/1976 | Prenntzell |
| 4,275,840 | A | 6/1981 | Staar |
| 4,301,923 | A | 11/1981 | Vuorento |
| 4,402,402 | A | 9/1983 | Pike |
| 4,485,920 | A | 12/1984 | Skylvik |
| 4,511,052 | A | 4/1985 | Klein et al. |
| D279,808 | S | 7/1985 | Pharo |
| 4,540,089 | A | 9/1985 | Maloney |
| 4,597,244 | A | 7/1986 | Pharo |
| 4,610,684 | A | 9/1986 | Knox et al. |
| 4,632,244 | A | 12/1986 | Landau |
| 4,704,314 | A | 11/1987 | Hsu et al. |
| 4,711,359 | A | 12/1987 | White et al. |
| 4,759,472 | A | 7/1988 | Strenger |
| 4,793,123 | A | 12/1988 | Pharo |
| 4,798,288 | A | 1/1989 | Holzner |
| 4,805,767 | A * | 2/1989 | Newman ...................... 206/219 |
| 4,872,556 | A | 10/1989 | Farmer |
| 4,872,558 | A | 10/1989 | Pharo |
| 4,874,093 | A | 10/1989 | Pharo |
| 4,890,744 | A | 1/1990 | Lane, Jr. et al. |
| 4,918,904 | A | 4/1990 | Pharo |
| 4,949,530 | A | 8/1990 | Pharo |
| 4,961,495 | A | 10/1990 | Yoshida et al. |
| 5,050,736 | A | 9/1991 | Griesbach |
| 5,100,028 | A | 3/1992 | Seifert |
| 5,114,004 | A | 5/1992 | Isono et al. |
| 5,126,070 | A | 6/1992 | Leifheit et al. |
| 5,131,760 | A | 7/1992 | Farmer |
| 5,137,154 | A | 8/1992 | Cohen |
| 5,207,320 | A * | 5/1993 | Allen ........................... 206/220 |
| 5,215,221 | A | 6/1993 | Dirksing |
| 5,272,856 | A | 12/1993 | Pharo |
| 5,325,968 | A | 7/1994 | Sowden |
| 5,373,966 | A | 12/1994 | O'Reilly et al. |
| 5,427,830 | A | 6/1995 | Pharo |
| 5,445,274 | A | 8/1995 | Pharo |
| 5,447,235 | A | 9/1995 | Pharo |
| 5,487,470 | A | 1/1996 | Pharo |
| 5,492,219 | A | 2/1996 | Stupar |
| 5,564,591 | A | 10/1996 | Christine |
| 5,588,532 | A | 12/1996 | Pharo |
| D386,074 | S | 11/1997 | Pharo |
| 5,711,691 | A | 1/1998 | Damask et al. |
| 5,775,491 | A | 7/1998 | Taniyama |
| 5,792,213 | A | 8/1998 | Bowen |
| 5,814,159 | A | 9/1998 | Paley et al. |
| 5,824,392 | A | 10/1998 | Gotoh et al. |
| 5,865,309 | A | 2/1999 | Futagawa et al. |
| 5,870,884 | A | 2/1999 | Pike |
| 5,910,138 | A | 6/1999 | Sperko et al. |
| 5,928,213 | A | 7/1999 | Barney et al. |
| 5,944,709 | A | 8/1999 | Barney et al. |
| 5,967,308 | A | 10/1999 | Bowen |
| 6,001,187 | A | 12/1999 | Paley et al. |
| 6,007,264 | A | 12/1999 | Koptis |
| 6,036,004 | A | 3/2000 | Bowen |
| 6,068,820 | A | 5/2000 | De Guzman |
| 6,165,161 | A | 12/2000 | York et al. |
| 6,198,106 | B1 | 3/2001 | Barney et al. |
| 6,203,535 | B1 | 3/2001 | Barney et al. |
| 6,468,377 | B1 | 10/2002 | Sperko et al. |
| 6,491,159 | B2 | 12/2002 | Shibata |
| 6,547,468 | B2 | 4/2003 | Gruenbacher et al. |
| 6,658,400 | B2 | 12/2003 | Perell et al. |
| 6,692,150 | B2 | 2/2004 | Hoshino |
| 6,726,364 | B2 | 4/2004 | Perell |
| 6,846,305 | B2 | 1/2005 | Smith et al. |
| 6,935,492 | B1 | 8/2005 | Loeb |
| 6,938,394 | B2 | 9/2005 | Perell |
| 6,968,952 | B2 | 11/2005 | Crevier et al. |
| 6,996,951 | B2 | 2/2006 | Smith et al. |
| 7,004,354 | B2 | 2/2006 | Harper |
| 7,051,879 | B2 | 5/2006 | Ramet |
| 7,055,683 | B2 | 6/2006 | Bourque et al. |
| 7,175,614 | B2 | 2/2007 | Gollier et al. |
| 7,306,095 | B1 | 12/2007 | Bourque et al. |
| 7,306,371 | B2 | 12/2007 | Perell |
| 7,597,691 | B2 | 10/2009 | Kawaguchi et al. |
| 7,644,821 | B2 | 1/2010 | Perell |
| 2002/0150658 | A1 | 10/2002 | Morrissette et al. |
| 2002/0170832 | A1 | 11/2002 | Klair |
| 2003/0019781 | A1 | 1/2003 | Kocher |
| 2004/0226848 | A1 | 11/2004 | Dunn-Rankin |
| 2006/0023976 | A1 | 2/2006 | Alvater et al. |
| 2006/0126970 | A1 | 6/2006 | Perell |
| 2007/0235369 | A1 | 10/2007 | Perell |
| 2007/0237431 | A1 | 10/2007 | Perell |
| 2007/0284375 | A1 | 12/2007 | Perell |
| 2007/0286535 | A1 | 12/2007 | Perell |
| 2007/0295766 | A1 | 12/2007 | Perell |
| 2008/0212904 | A1 | 9/2008 | Perell |

FOREIGN PATENT DOCUMENTS

| | | |
|---|---|---|
| EP | 00317130 A1 | 5/1989 |
| EP | 0709302 A1 | 5/1996 |
| FR | 2345363 A1 | 10/1977 |
| GB | 2253605 A | 9/1992 |
| JP | 04215927 A | 8/1992 |
| JP | 7/8236 | 7/1995 |
| JP | 2003146364 | 5/1996 |
| JP | 11029176 A | 2/1999 |
| JP | 200255598 A | 9/2000 |
| JP | 2002503187 | 1/2002 |
| JP | 2002037327 | 2/2002 |
| WO | WO 96/23700 A1 | 8/1996 |
| WO | WO 02/083504 A1 | 10/2002 |
| WO | WO 2004/100856 A2 | 11/2004 |
| WO | WO 2005/022323 A | 3/2005 |
| WO | WO 2005/077811 A1 | 8/2005 |
| WO | WO 2009/086344 A1 | 7/2009 |
| WO | WO 2009/086346 A1 | 7/2009 |
| WO | WO 2009/088759 A1 | 7/2009 |
| WO | WO 2009/086344 A1 | 9/2009 |

OTHER PUBLICATIONS

U.S. Appl. No. 12/704,914, filed Feb. 12, 2010, entitled Package Containing a Breachable Bubble in Combination with a Closure Device.

U.S. Appl. No. 12/703,947, filed Feb. 11, 2010, entitled Package with Unique Opening Device and Process for Forming Package.

U.S. Appl. No. 12/811,455, filed Jul. 1, 2010, entitled Pour Channel with Cohesive Closure Valve and Locking Bubble.

* cited by examiner

PACKAGE WITH UNIQUE OPENING DEVICE AND METHOD FOR OPENING PACKAGE

RELATED APPLICATIONS

The present application claims priority to U.S. Provisional Patent Application No. 61/332,420, filed on May 7, 2010, and is a continuation-in-part application of U.S. patent application Ser. No. 12/695,691, filed on Jan. 28, 2010, which is a divisional reissue application of U.S. patent application Ser. No. 12/184,809, filed Aug. 1, 2008, granted Apr. 27, 2010, as U.S. Pat. No. RE 41,273, which is a reissue application of U.S. Pat. No. 7,306,371, filed Dec. 14, 2004, as U.S. patent application Ser. No. 11/010,915, granted Dec. 11, 2007, which is a continuation-in-part of U.S. patent application Ser. No. 10/831,964, filed Apr. 26, 2004, now U.S. Pat. No. 6,938,394, granted Sep. 6, 2005, which is a continuation-in-part of U.S. patent application Ser. No. 10/246,893, filed Sep. 19, 2002, now U.S. Pat. No. 6,726,364, granted Apr. 27, 2004. The subject matter of each of the above-referenced issued patents and published applications is fully incorporated herein by reference, and for all purposes.

BACKGROUND OF THE INVENTION

Many products, especially consumer products, are packaged in flexible bags made from a plastic or polymer film. Packages made from polymer films can offer various advantages. For instance, the polymer films can be wrapped tightly around the products for eliminating void space. The resulting packages are not very bulky and are easy to handle. The polymer films can sometimes be translucent, allowing a purchaser to view the contents prior to making the purchase. In addition, the polymer films can be printed with decorative graphics to make the product more attractive.

Although packages made from polymer films can provide various advantages, opening such packages can be quite difficult. For example, the polymer films must have sufficient strength to prevent against rupture during the packaging process and during subsequent transportation. Increasing the strength of the film or the seals that surround the content of the package, however, often increases the difficulty in opening the package. For example, many such packages, such as packages that contain cereals, potato chips, and the like, do not include an easy opening feature. Thus, brute force, scissors, a knife, or another suitable instrument need to be used in order to open the package.

Examples of opening devices for packages are disclosed in, for example, U.S. Pat. No. 6,726,364 to Perell et al., U.S. Pat. No. 6,938,394 to Perell, U.S. Pat. No. 7,306,371 to Perell, U.S. Pat. No. 7,644,821 to Perell, U.S. Pat. No. RE 41,273 to Perell, U.S. Patent Appl. Pub. No. 20080212904 to Perell, U.S. Patent Appl. Pub. No. 20070295766 to Perell, U.S. Patent Appl. Pub. No. 20070286535 to Perell, U.S. Patent Appl. Pub. No. 20070284375 to Perell, U.S. Patent Appl. Pub. No. 20070241024 to Perell, U.S. Patent Appl. Pub. No. 20070237431 to Perell, U.S. Patent Appl. Pub. No. 20070235369 to Perell, U.S. Patent Appl. Pub. No. 20070235357 to Perell, U.S. Patent Appl. Pub. No. 20060126970 to Perell, U.S. Patent Appl. Pub. No. 20040231292 to Perell, and U.S. Patent Appl. Pub. No. 20040057638 to Perell et al. The subject matter of each of the above-referenced issued patents and published applications is fully incorporated herein by reference, and for all purposes.

In view of the above, a need currently exists for a package with an opening device that facilitates easy opening of the package, and for a method for opening the package. Further, a package with an opening device that, upon opening, provides a passage through the opening device for access from the ambient to the product within the package would be advantageous.

BRIEF DESCRIPTION OF THE INVENTION

Aspects and advantages of the invention will be set forth in part in the following description, or may be obvious from the description, or may be learned through practice of the invention.

In one embodiment, a package is disclosed. The package includes a first film and a second film. The first film and the second film form an enclosure and at least one tab area and define a package periphery. The enclosure defines an interior volume configured to receive a product. The package further includes a first breachable bubble formed within a first tab portion of the at least one tab area, and a second breachable bubble formed within a second tab portion of the at least one tab area. Sufficient fluid is trapped within the first breachable bubble and the second breachable bubble such that, upon application of pressure by a user to the at least one tab area, the first breachable bubble breaches, separating a first sealed portion of the first film and the second film to form a first breach passage between the enclosure and the first tab portion, and the second breachable bubble breaches, separating a second sealed portion of the first film and the second film to form a second breach passage between the second tab portion and the package periphery. In a first position, the first tab portion and the second tab portion are substantially sealed from each other to facilitate breaching. In a second position, the first tab portion and the second tab portion are in fluid communication with each other.

In another embodiment, a method for opening a package is disclosed. The method includes the step of applying pressure to at least one tab area of the package. The package includes a first film and a second film, the first film and the second film forming an enclosure and the at least one tab area and defining a package periphery, the enclosure defining an interior volume configured to receive a product. The at least one tab area includes a first tab portion and a second tab portion. The first tab portion and the second tab portion are disposed in a first position substantially sealed from each other. The method further includes the steps of breaching a first breachable bubble and breaching a second breachable bubble. The first breachable bubble is formed within the first tab portion. The second breachable bubble is formed within the second tab portion. The method further includes the step of causing the first tab portion and the second tab portion to shift from the first position to a second position in fluid communication with each other.

In yet another embodiment, a process for forming a package is disclosed. The process includes providing a first film, and forming an enclosure and at least one tab area in the first film. The enclosure defines an interior volume configured to receive a product. The process additionally includes introducing a fluid into the at least one tab area, and providing a second film adjacent the first film. Further, the process includes sealing the first film and the second film together to define a package periphery and form at least one breachable bubble in the at least one tab area. Sufficient fluid may be trapped within the at least one breachable bubble such that, upon application of pressure by a user to the at least one tab area, the breachable bubble breaches, separating a sealed portion of the first film from the second film.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present invention is directed to a package that includes a unique opening device for opening the package, and to a process for opening the package. The package, in one embodiment, can be made from one or more layers of a polymer film. The walls of the package, for example, can be flexible. In the past, such packages have been relatively difficult to open. In accordance with the present disclosure, however, the package includes a first breachable bubble and a second breachable bubble formed within discrete portions of a tab area of the package. Sufficient fluid may be trapped within the first and second breachable bubbles that the bubbles may breach upon application of pressure by a user. Breaching of the bubbles can cause various sealed portions of the layers of film to separate. Further, the bubbles may in some embodiments breach substantially simultaneously, thus causing the various sealed portions of the layers of film to separate substantially simultaneously. When the sealed portions are separated, the layers of film may provide a passage through the tab area such that the contents of the package are easily accessible.

Figure 1:
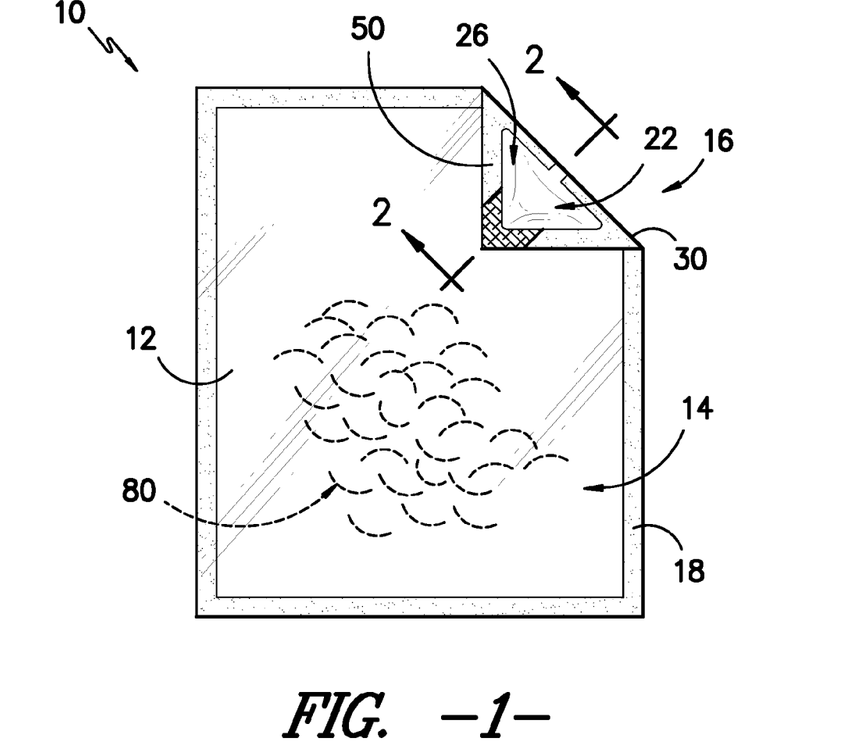
FIG. 1 is a top view of one embodiment of a package of the present disclosure in a first position.

Referring to FIG. 1, reference numeral 10 generally indicates a package in accordance with one embodiment of the present invention. The package 10 may include a first film 11 (see FIGS. 2 through 4) and a second film 12. The first film 11 and second film 12 may, in general, be flexible polymer films. In one embodiment of the present invention, the first film 11 and the second film 12 may be portions of a singular sheet of flexible polymer film. In another embodiment, the first film 11 and the second film 12 may be separate sheets of flexible polymer film. It should be understood that the package 10 can have any suitable shape depending upon various factors including the type of product contained in or to be received in the package.

The first film 11 and the second film 12 can be made from any suitable polymer. Polymers that may be used to form the package include, for instance, polyolefins such as polyethylene and polypropylene, polyesters, polyamides, polyvinyl chloride, mixtures thereof, copolymers thereof, terpolymers thereof, and the like. In addition, the package can also be made from any suitable elastomeric polymer. It should be understood, however, that the first film 11 and the second film 12 are not limited to flexible polymer films, but may be any suitable films. For example, the first film 11 and second film 12 may be formed from aluminum, laminated paper, or the like.

The first film 11 and the second film 12 can each comprise a single layer of material or can comprise multiple layers. For instance, the first film 11 and the second film 12 can each include a core layer of polymeric material coated on one or both sides with other functional polymeric layers. The other functional polymeric layers may include, for instance, an oxygen barrier layer, an ultraviolet filter layer, an anti-blocking layer, a printed layer, and the like.

The first film 11 and the second film 12 can each be translucent or transparent. If translucent or transparent, for instance, the contents of the package 10 can be viewed from the outside. In another embodiment, however, the first film 11 and the second film 12 can each be opaque. For instance, in one embodiment, the package 10 can display various graphics that identify, for instance, the brand and the description of the product inside, or that display coupons or various other indicia. In other embodiments, the first film 11 can be translucent or transparent while the second film 12 is opaque, and the first film 11 can be opaque while the second film 12 is translucent or transparent.

In accordance with the present disclosure, the first film 11 and the second film 12 may be sealed together to form an enclosure 14 and at least one tab area 16. The first film 11 and the second film 12 may be sealed together using any suitable sealing technique, or may be sealed together using an adhesive layer 72. Suitable adhesives 72 may include heat seal adhesives, cold seal adhesives, drying adhesives, emulsion adhesives, light curing adhesives, or any other suitable adhesives.

The first film 11 and the second film 12 may define a package periphery 18. The enclosure 14 may define an interior volume 15 configured to receive a product 80 (see FIGS. 1 and 5). In one embodiment, a product 80 may be situated in the interior volume 15. The product 80 may, in some embodiments, be a consumer product. In one embodiment, for example, the product 80 may include a gel, a cream, a paste, a syrup, a honey, an oil, a sauce, a lubricant, or a grease. In some embodiments, the product 80 may include an emulsion, such as a mayonnaise. In some embodiments, the product 80 may include a liquid, such as a beverage. In other embodiments, the product 80 may include a solid, such as a powder or a granulated solid. Further, in other embodiments, the product 80 may include a gas. It should further be understood that the product 80 may include any combination of products in various states. For example, the product 80 may include a liquid and a solid, and may be, for example, a relish or other food product or condiment, or any other suitable product or consumer product.

Further, the product 80 may be capable of changing states upon exposure to air when the package 10 of the present disclosure is opened. For example, the product 80 may include a solid which, when exposed to air, becomes a liquid, or the product 80 may include a solid which, when exposed to air, becomes a gas. For example, the product 80 may include ice that turns to water, or may include carbon dioxide that undergoes sublimation. Further, the product 80 may include a liquid which, when exposed to air, becomes a gas, or the product 80 may include a gas which, when exposed to air, becomes a liquid. For example, the product 80 may include water that turns to water vapor, or may include water vapor that turns to water. It should be understood that the product 80 of the present disclosure may undergo any phase change, including sublimation, deposition, deionization, ionization, vaporization, condensation, freezing, or melting.

Figure 5:
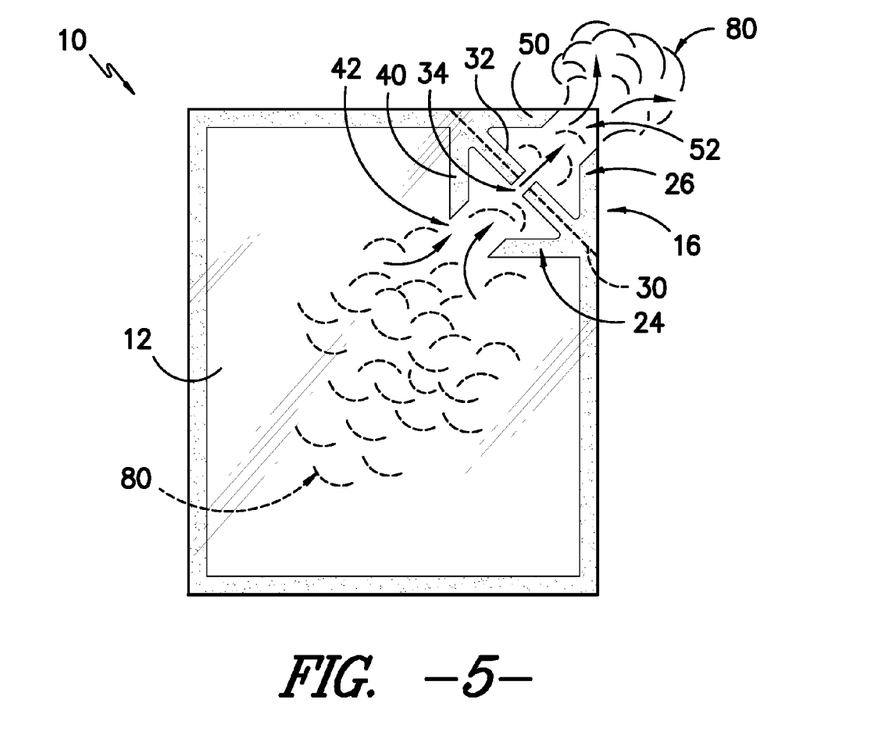
FIG. 5 is a top view of one embodiment of a package of the present disclosure in a second position.
Figures 8, 9:
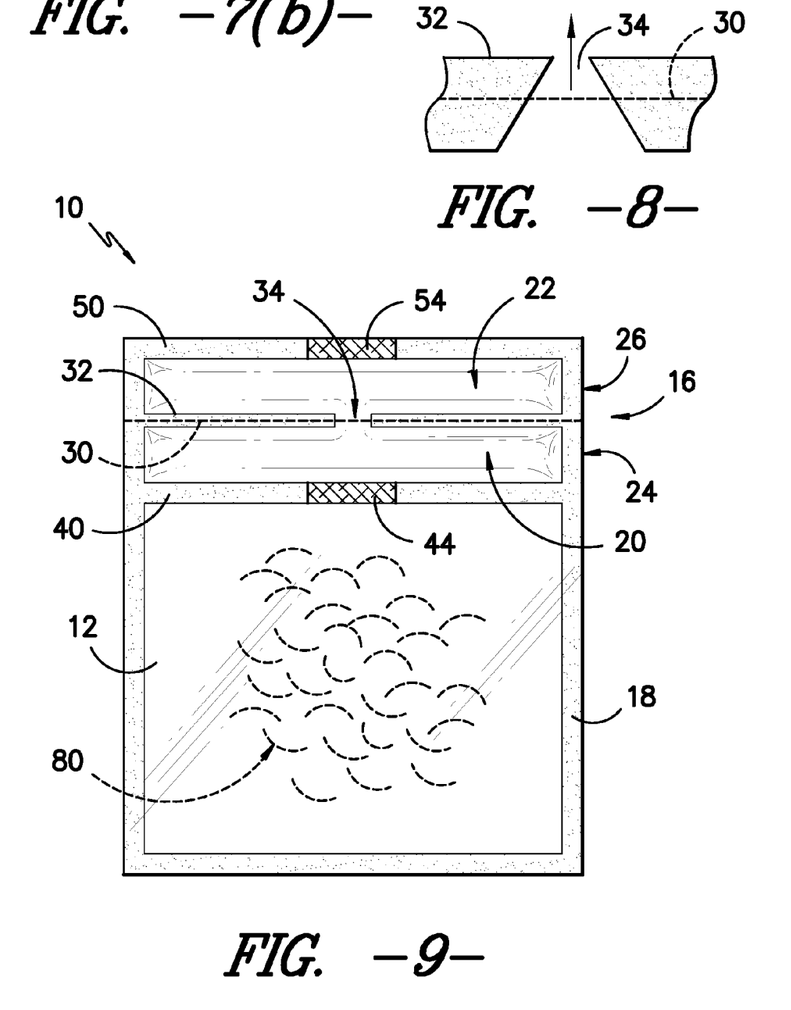
FIG. 8 is a top view of another alternative embodiment of the barrier of the present disclosure.
FIG. 9 is a top view of an alternative embodiment of a package of the present disclosure in a second position.

In general, the tab area 16 may be located near the package periphery 18. For example, the tab area 16 may be located in a corner of the package 10, as shown in FIGS. 1 and 5, or on an end of the package 10, as shown in FIG. 9, or may be located at any other location on the package 10. The package 10 may include a singular tab area 16, or may alternatively include a plurality of tab areas 16 situated about the package periphery 18.

The package 10 may further include a first breachable bubble 20 and a second breachable bubble 22. The first breachable bubble 20 may be formed within a first tab portion 24 of the tab area 16. The second breachable bubble 22 may be formed within a second tab portion 26 of the tab area 16. For example, in certain embodiments, the first breachable bubble 20 and the second breachable bubble 22 may be portions of a singular breachable bubble. A fold line 30, as discussed below, may generally define the first tab portion 24 and the second tab portion 26, and may thus also define the first breachable bubble 20 and the second breachable bubble 22. Alternatively, the first breachable bubble 20 and the second breachable bubble 22 may be generally discrete breachable bubbles. The package 10 may include a barrier 32 disposed in the at least one tab area 16. The barrier 32 may divide the tab area 16 into the first tab portion 24 and the second tab portion 26, as discussed below, and may thus also define the first breachable bubble 20 and the second breachable bubble 22. It should be understood that, while the first breachable bubble 20 and the second breachable bubble 22 may in some embodiments be generally discrete breachable bubbles, the discrete bubbles may in some embodiments and positions as discussed below be in fluid communication, and in other embodiments and positions as discussed below be substantially sealed from each other.

Figure 2:
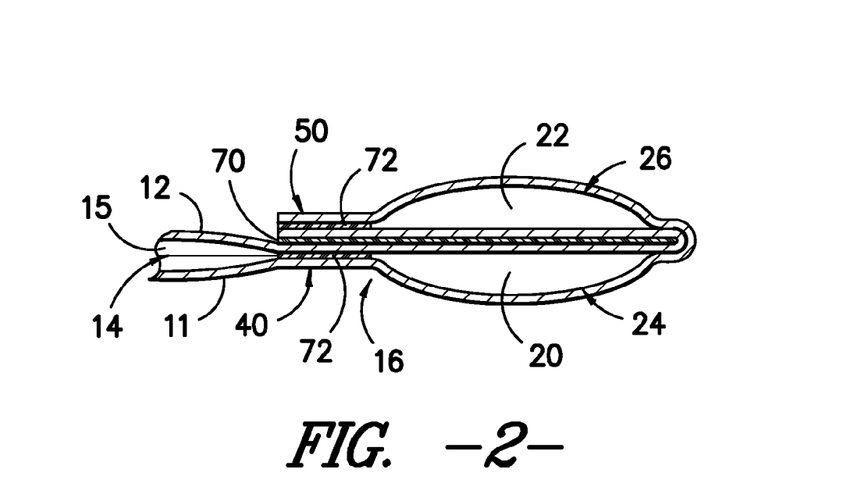
FIG. 2 is a cross-sectional view of one embodiment of the first and second breachable bubbles of the present disclosure in a first position.
Figure 3:
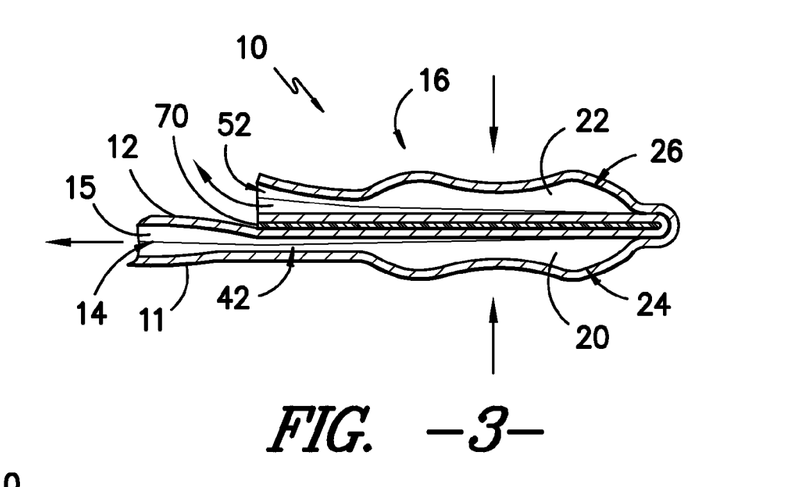
FIG. 3 is a cross-sectional view of one embodiment of the first and second breachable bubbles of the present disclosure in a first position as pressure is applied to the breachable bubbles, causing the breachable bubbles to breach.
Figure 4:
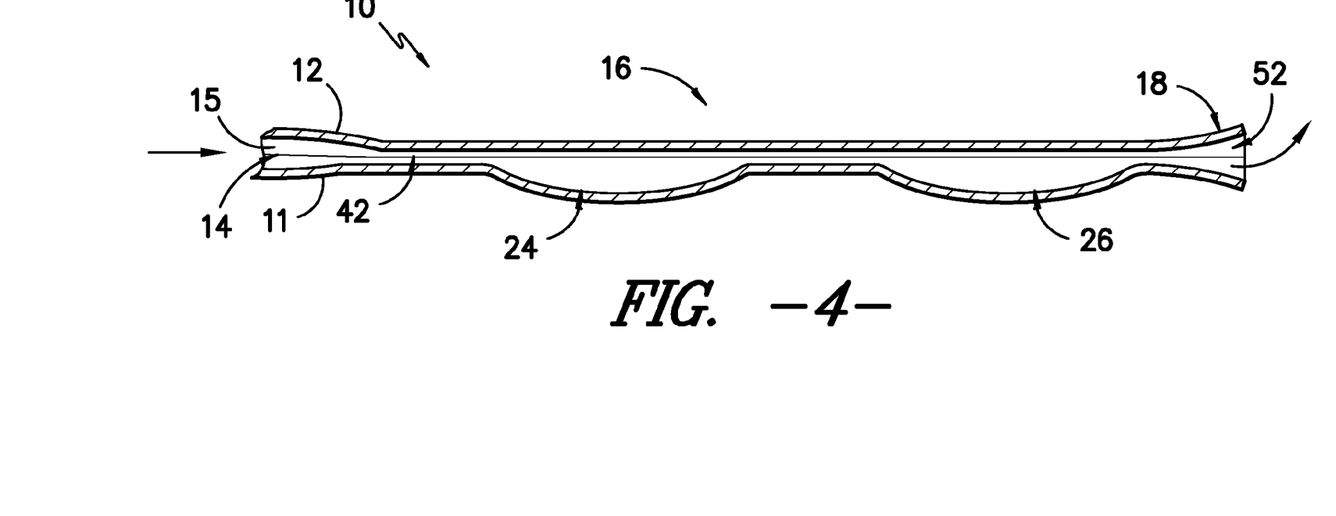
FIG. 4 is a cross-sectional view of one embodiment of the first and second breachable bubbles of the present disclosure in a second position.

In exemplary embodiments, the first breachable bubble 20 and the second breachable bubble 22 may project from the tab area 16 only into the first film 11, as shown in FIGS. 2 through 4. In alternative embodiments, however, the first breachable bubble 20 and the second breachable bubble 22 may project from the tab area 16 only into the second film 12, or into both the first film 11 and the second film 12. Further, it should be understood that the first breachable bubble 20 and the second breachable bubble 22 need not project from the tab area 16 in the same direction. For example, one of the first breachable bubble 20 and the second breachable bubble 22 may project from the tab area 16 into the first film 11, while the other may project from the tab area 16 into the second film 12.

Sufficient fluid may be trapped within the first breachable bubble 20 such that, upon application of pressure by a user to the at least one tab area 16, the first breachable bubble 20 breaches, separating a first sealed portion 40 of the first film 11 from the second film 12, as shown in FIG. 3. For example, the first breachable bubble 20 may breach upon application of pressure by the user to the first tab portion 24 of the tab area 16. When the first breachable bubble 20 breaches, it may separate the first sealed portion 40 of the first film 11 and the second film 12 to form a first breach passage 42 between the enclosure 14 and the first tab portion 24, as shown in FIGS. 2 through 5.

Sufficient fluid may also be trapped within the second breachable bubble 22 such that, upon application of pressure by a user to the at least one tab area 16, the second breachable bubble 22 breaches, separating a second sealed portion 50 of the first film 11 from the second film 12, as shown in FIG. 3. For example, the second breachable bubble 22 may breach upon application of pressure by the user to the second tab portion 26 of the tab area 16. When the second breachable bubble 22 breaches, it may separate the second sealed portion 50 of the first film 11 and the second film 12 to form a second breach passage 52 between the second tab portion 26 and the package periphery 18, as shown in FIGS. 2 through 5.

The fluid may be, for example, a liquid or a gas. In one embodiment, the fluid may be air.

The first sealed portion 40 may generally be the peripheral seal partially surrounding and defining the tab area 16, such as partially surrounding and defining the first tab portion 24. The first sealed portion 40 may be formed using any suitable sealing technique, or may be sealed together using an adhesive layer 72, as discussed above. In certain embodiments, the first sealed portion 40 may include a first breach point 44. The first breach point 44 may be an area in the first sealed portion 40 that more easily separates than the remainder of the first sealed portion 40 when the first breachable bubble 20 is breached. Thus, when the first breachable bubble 20 breaches, the first film 11 and the second film 12 may separate at the first breach point 44. Further, when the first breachable bubble 20 breaches, the first breach passage 42 may be formed at and through the first breach point 44.

The second sealed portion 50 may generally be the peripheral seal partially surrounding and defining the tab area 16, such as partially surrounding and defining the second tab portion 26. The second sealed portion 50 may be formed using any suitable sealing technique, or may be sealed together using an adhesive layer 72, as discussed above. For example, the second sealed portion 50 may, in some embodiments, include a portion of the package periphery 18. In certain embodiments, the second sealed portion 50 may include a second breach point 54. The second breach point 54 may be an area in the second sealed portion 50 that more easily separates than the remainder of the second sealed portion 50 when the second breachable bubble 22 is breached. Thus, when the second breachable bubble 22 breaches, the first film 11 and the second film 12 may separate at the second breach point 54. Further, when the second breachable bubble 22 breaches, the second breach passage 52 may be formed at and through the second breach point 54.

The first breachable bubble 20 and second breachable bubble 22 may each provide a distinct breaching sound when the bubbles 20 and 22 are breached. The breaching sound may be caused by the trapped fluid escaping from the first tab portion 24 and second tab portion 26 when the first breachable bubble 20 and second breachable bubble 22, respectively, are breached. For example, in one embodiment, the first breachable bubble 20 and second breachable bubble 22 may each provide a popping sound, similar to a small balloon popping, when the breachable bubbles 20 and 22 are breached. In other embodiments, the first breachable bubble 20 and second breachable bubble 22 may provide, for example, peeping sounds, snapping sounds, or whistling sounds.

The package 10 of the present disclosure may further alternate between a first position, as shown in FIGS. 1 through 3, and a second position, as shown in FIGS. 4, 5, and 9. In the first position, the first tab portion 24 and the second tab portion 26 may be substantially sealed from each other to facilitate breaching. For example, with the first tab portion 24 and the second tab portion 26 substantially sealed from each other, the first breachable bubble 20 and second breachable bubble 22 may be substantially sealed from each other. Thus, in the first position, each of the first and second breachable bubbles 20 and 22 may breach individually upon application of pressure by a user. For example, upon application of pressure to the first tab portion 24, only the first breachable bubble 20 may breach, while upon application of pressure to the second tab portion 26, only the second breachable bubble 22 may breach.

In exemplary embodiments, the first film 11 and the second film 12 in the first position may be folded such that the portion of the second film 12 defined by the second tab portion 26 is disposed adjacent and releasably secured to the portion of the second film 12 defined by the first tab portion 24, as shown in FIGS. 2 and 3. Thus, for example, the first breachable bubble 20 and second breachable bubble 22 may be in a generally "stacked" first position, with the second breachable bubble 22 generally on top of or below the first breachable bubble 20 with respect to the direction of application of pressure by a user, shown by the vertical arrows in FIG. 3.

In certain embodiments, folding the first film 11 and the second film 12 may create a fold line 30. For example, the fold line 30 may generally be a crease in the first film 11 and/or the second film 12 caused by folding the first film 11 and the second film 12. Alternatively, however, the fold line 30 may be included in the first film 11 and/or the second film 12 before the first film 11 and the second film 12 are folded, to assist in folding and to ensure that the folding is done at the proper location. The fold line 30 may define the first tab portion 24 and the second tab portion 26.

An adhesive layer 70 may releasably secure the portion of the second film 12 defined by the second tab portion 26 to the portion of the second film 12 defined by the first tab portion 24 when the first film 11 and the second film 12 are in the first position, as shown in FIGS. 2 and 3. The adhesive layer 70 may be any adhesive layer, substance or compound that can provide a bond between the various portions of the film layer 12 when the package 10 is in the first position, and that can release the various portions of the film layer 12 from each other upon manipulation of the tab area 16 by a user. For example, in exemplary embodiments, the adhesive layer 70 may be a hot melt adhesive. A user may, before, during or after the application of pressure to the tab area 16, rub the tab area 16, such as the tab portions 24 and 26, between the user's fingers. In exemplary embodiments, this slight manipulation may be sufficient to break the bond of the adhesive layer 70 and separate the various portions of the film layer 12. Thus, in exemplary embodiments, the user may advantageously break the bond of the adhesive layer 70 using only one hand. Alternatively, the user may pull or peel the various portions of the film layer 12 apart, or may separate the various portions using any known separation technique. It should be understood that the adhesive layer 70 may be applied to the entire portion of the second film 12 defined by the second tab portion 26 and the entire portion of the second film 12 defined by the first tab portion 24, or to only parts of the portion of the second film 12 defined by the second tab portion 26 and the portion of the second film 12 defined by the first tab portion 24, such as by spot-application of the adhesive layer 70.

Figure 11:
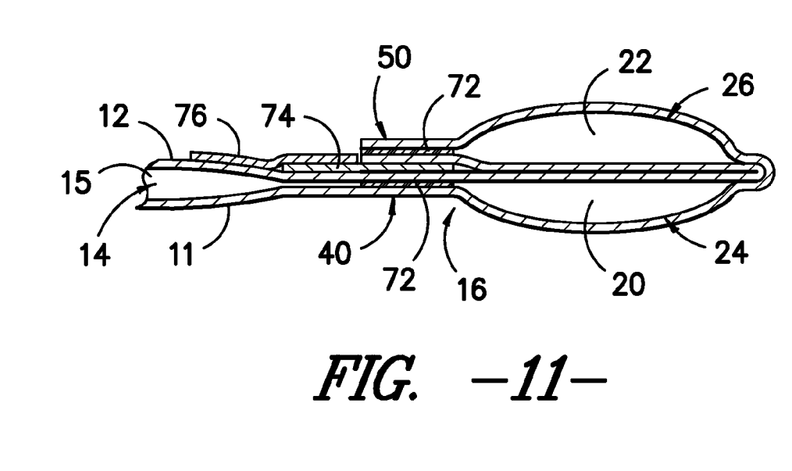
FIG. 11 is a cross-sectional view of another embodiment of the first and second breachable bubbles of the present disclosure in a first position.
Figure 12:
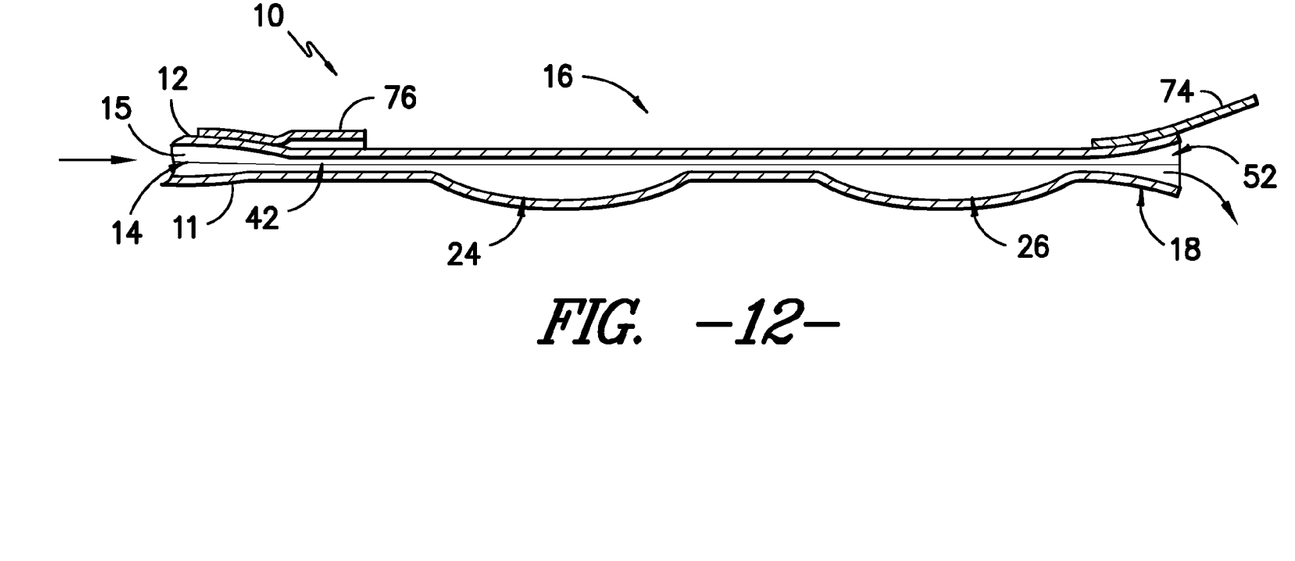
FIG. 12 is a cross-sectional view of another embodiment of the first and second breachable bubbles of the present disclosure in a second position.

Additionally or alternatively, a male fastener 74 and a female fastener 76 may releasably secure the portion of the second film 12 defined by the second tab portion 26 to the portion of the second film 12 defined by the first tab portion 24 when the first film 11 and the second film 12 are in the first position, as shown in FIGS. 11 and 12. The male fastener 74 may, in exemplary embodiments, be a tab projecting from the second film 12. Alternatively, the male fastener 74 may be, for example, a hook, the hook portion of a hook and loop fastener, a protrusion, or any other suitable male component of a fastening device. The female fastener 76 may, in exemplary embodiments, be a slot projecting from or defined in the second film 12. Alternatively, the female fastener 76 may be, for example, a mating hook, a loop, the loop portion of a hook and loop fastener, a depression, or any other suitable female component of a fastening device. The male fastener 74 may project from the second film 12 adjacent to the portion of the second film 12 defined by the first tab portion 24. In this embodiment, while the female fastener 76 projects from or is defined in the second film 12 adjacent to the portion of the second film 12 defined by the second tab portion 26. Alternatively, the female fastener 76 may project from or be defined in the second film 12 adjacent to the portion of the second film 12 defined by the first tab portion 24. In this embodiment, the male fastener 74 projects from the second film 12 adjacent to the portion of the second film 12 defined by the second tab portion 26. The male fastener 74 may be tucked, slid, or hooked into, or otherwise releasably secured to, the female fastener 76. As discussed above, a user may, before, during or after the application of pressure to the tab area 16, rub the tab area 16, such as the tab portions 24 and 26, between the user's fingers. In exemplary embodiments, this slight manipulation may be sufficient to separate the male fastener 74 from the female fastener 76 and thus separate the various portions of the film layer 12. In exemplary embodiments, the user may advantageously separate the male fastener 74 and female fastener 76 using only one hand. Alternatively, the user may pull or peel the various portions of the film layer 12 apart, or may separate the various portions using any known separation technique. It should be understood that more than one male fastener 74 and female fastener 76 may be included adjacent to the tab portions 24 and 26, and that any of the fasteners 74, 76 may be included adjacent to either of the tab portions 24 and 26, with the mating fastener 74, 76 included adjacent to the other tab portion 24 or 26.

In the second position, as shown in FIGS. 4, 5, and 9, the first tab portion 24 and the second tab portion 26 may be in fluid communication with each other. For example, when the first tab portion 24 and the second tab portion 26 are in fluid communication with each other, the first breachable bubble 20 and the second breachable bubble 22 may be in fluid communication with each other. Further, in the second position, the portion of the second film 12 defined by the second tab portion 26 may be released from the portion of the second film 12 defined by the first tab portion 24, as discussed above.

It should be understood that the adhesive layer 70 may, in some embodiments, remain on the various portions of the film layer 12 after the bond of the adhesive layer 70 is broken, and may thus be utilized to re-secure the various portions of the film layer 12 together. Thus, the user could, after opening the package 10 of the present disclosure as described herein, reseal the package 10 to save or store all or a portion of the product 80 contained in the interior volume 15 of the package 10 by moving the package 10 from the second position to the first position and squeezing the various portions of the film layer 12 together, thus reforming the releasable bond between the various portions of the film layer 12 and the adhesive layer 70.

It should further be understood that, in some embodiments, the male and female components 74 and 76 may be utilized to re-secure the various portions of the film layer 12 together. Thus, the user could, after opening the package 10 of the present disclosure as described herein, reseal the package 10 to save or store all or a portion of the product 80 contained in the interior volume 15 of the package 10 by moving the package 10 from the second position to the first position and, for example, tucking, sliding, or hooking the male component 74 into the female component 76, thus refastening the various portions of the film layer 12 together.

In exemplary embodiments, the first breachable bubble 20 and the second breachable bubble 22 may breach substantially simultaneously upon application of pressure by a user to the at least one tab area 16. For example, as discussed above, the package 10 in the first position may include the portion of the second film 12 defined by the second tab portion 26 being folded such that it is disposed adjacent and releasably secured to the portion of the second film 12 defined by the first tab portion 24, as shown in FIGS. 2 and 3. A user applying pressure to the tab area 16 may thus apply pressure to both the first tab portion 24 and the second tab portion 26, as indicated by the vertical arrows in FIG. 3. For example, a user may hold the tab area 16 between the user's thumb and forefingers, and may squeeze the tab area 16. By squeezing the tab area 16 between the thumb and forefingers, the user may apply pressure to both the first tab portion 24 and the second tab portion 26 substantially simultaneously, resulting in breaching the first breachable bubble 20 and the second breachable bubble 22 substantially simultaneously. Thus, in exemplary embodiments, the user may advantageously breach the first breachable bubble 20 and the second breachable bubble 22 substantially simultaneously using only one hand. Alternatively, however, the first breachable bubble 20 and the second breachable bubble 22 may be breached individually, or may be breached in sequence.

In operation, the first breachable bubble 20 may be breached to form the first breach passage 42 between the enclosure 14 and the first tab portion 24, and the second breachable bubble 22 may be breached to form the second breach passage 52 between the second tab portion 26 and the package periphery 18, as discussed above. Thus, when the breachable bubbles 20 and 22 are breached and the package 10 is in the second position, such that the first tab portion 24 and the second tab portion 26 are in fluid communication with each other, the enclosure 14 and the package periphery 18 may be in fluid communication through the tab area 16. For example, the enclosure 14 and the package periphery 18 may be in fluid communication through the first breach passage 42 and second breach passage 52 and the first tab portion 24 and the second tab portion 26. The product 80 may be allowed to flow from the enclosure 14 through the first breach passage 42 into the first tab area 24, continue to flow from the first tab area 24 into the second tab area 26, and flow from the second tab area 26 through the second breach passage 52 to the package periphery 18, as shown by the arrows in FIG. 4. When the product 80 reaches the package periphery 18, it may be exposed to the ambient environment external to the package 10. The product 80 may then be, for example, sprayed into the ambient environment, applied to a substrate external to the package 10 such as to the skin or hair, poured out of the package 10, or squeezed out of the package 10. In certain embodiments, the product 80 may flow from the package 10 without any assistance from the user, while in other embodiments, the product 80 may flow from the package 10 upon the application of pressure by the user to the enclosure 14. Thus, in exemplary embodiments, a user opening the package 10 of the present disclosure may "pop", or breach, the first breachable bubble 20 and the second breachable bubble 22 and then, after causing the package 10 to move from the first position to the second position, squeeze the product 80 from the package 10.

In certain embodiments, the package 10 of the present disclosure may further include a barrier 32 disposed in the at least one tab area 16. The barrier 32 may divide the tab area 16 into the first tab portion 24 and the second tab portion 26. The barrier 32 may further define a barrier passage 34 therethrough. Thus, when the first tab portion 24 and the second tab portion 26 are in fluid communication with each other in the second position, the fluid communication may be through the barrier passage 34.

Figure 6:
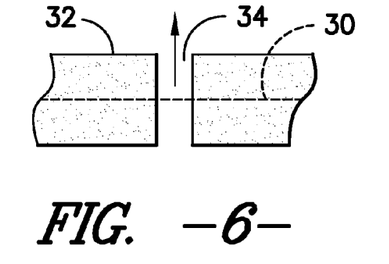
FIG. 6 is a top view of one embodiment of the barrier of the present disclosure.
Figure 7A:
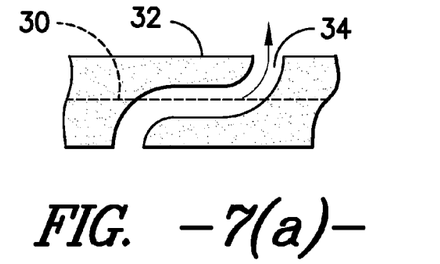
FIGS. 7(a) and 7(b) are top views of alternative embodiments of the barrier of the present disclosure.
Figure 7B:
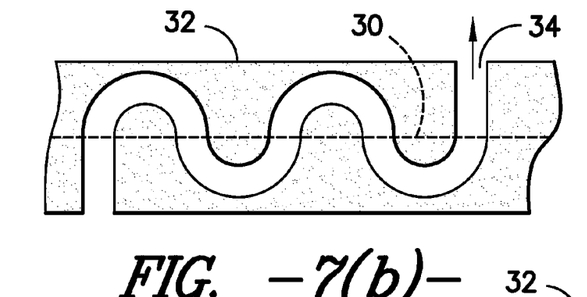

The barrier passage 34 may advantageously control the flow of the product 80 through the tab area 16 when the breachable bubbles 20 and 22 have been breached and the package 10 is in the second position. For example, in various embodiments as shown in FIG. 6, the barrier passage 34 may be a substantially straight passage between the first tab portion 24 and the second tab portion 26. The width of the barrier passage 34 may vary depending on the desired flow characteristics of the product 80. Alternatively, in various embodiments as shown in FIGS. 7(a) and 7(b), the barrier passage 34 may be a circuitous or serpentine passage between the first tab portion 24 and the second tab portion 26. Both the width of the barrier passage 34 and the circuitous or serpentine path of the barrier passage 34 may vary depending on the desired flow characteristics of the product 80. In other alternative embodiments as shown in FIG. 8, the barrier passage 34 may be a tapered passage between the first tab portion 24 and the second tab portion 26, with a width adjacent to the first tab portion 24 that is narrower or wider than the width adjacent to the second tab portion 26, depending on the desired flow characteristics of the product 80.

Figure 10:
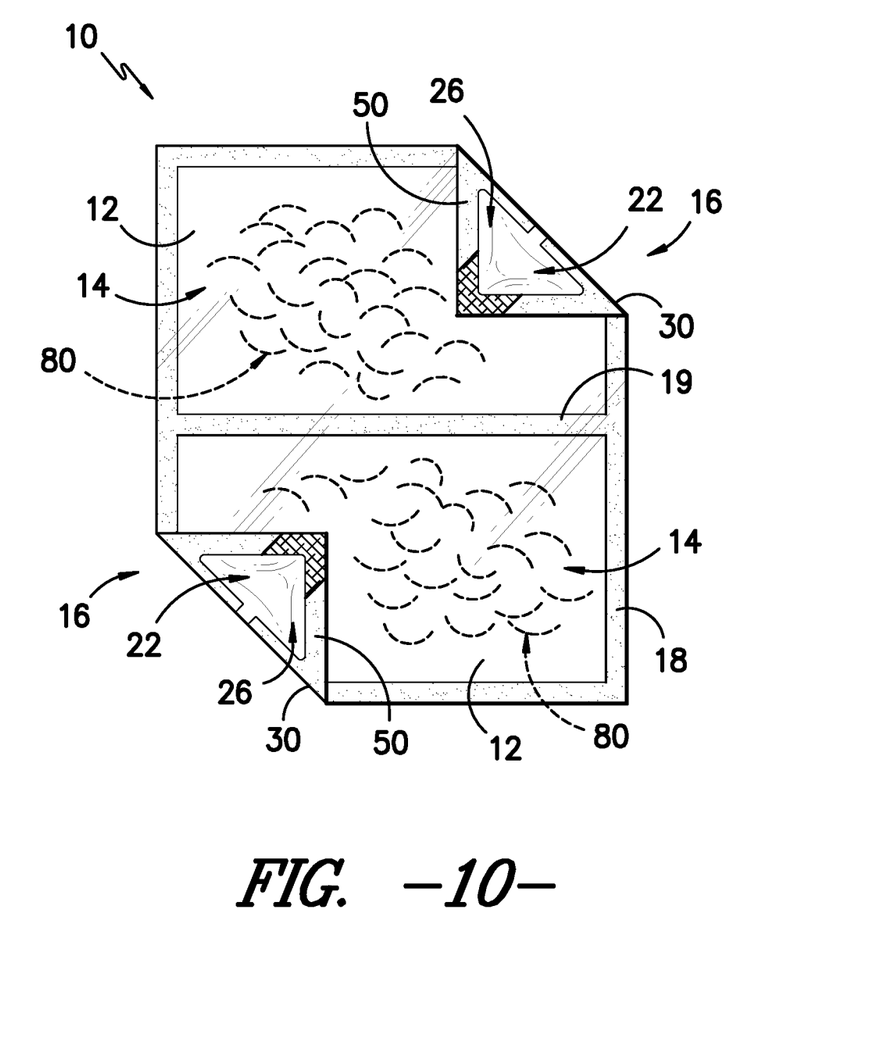
FIG. 10 is a top view of an alternative embodiment of a package of the present disclosure in a first position.

As shown in FIG. 10, the package 10 of the present enclosure may include more than one enclosure 14 and more than one tab area 16. For example, the first film 11 and the second film 12 may be sealed together to form a plurality of enclosures 14 and a plurality of tab areas 16. The enclosures 14 may be sealed from each other by enclosure seals 19, which may be sealed similarly to the first and second sealed portions 40 and 50 and the peripheral seals 18, such as through the use of an adhesive layer 72. In exemplary embodiments, each of the enclosures 14 may be coupled with at least one tab area 16. Thus, the package 10 of the present disclosure may be utilized with more than one product 80. For example, one type of product 80 may be situated in the interior volume 15 of one enclosure, while other related or unrelated products 80 may be situated in the interior volumes 15 of other enclosures. The products 80 may be, for example, ketchup and mustard, different types of mustards, shampoo and conditioner, or any other suitable gel-like products, liquid products, solid or granulated solid products, or mixtures of products, as discussed above.

The present disclosure is also directed to a method for opening a package 10. The method may include the step of, for example, applying pressure to at least one tab area 16 of the package 10. The at least one tab area 16 may include a first tab portion 24 and a second tab portion 26. The first tab portion 24 and the second tab portion 26 may be disposed in a first position substantially sealed from each other, as discussed above.

The method may further include the steps of breaching a first breachable bubble 20 and breaching a second breachable bubble 22. The first breachable bubble 20 may be formed within the first tab portion 24, and the second breachable bubble 22 may be formed within the second tab portion 26, as discussed above.

In certain exemplary embodiments, the step of breaching the first breachable bubble 20 may include separating a first sealed portion 40 of the first film 11 and the second film 12 to form a first breach passage 42 between the enclosure 14 and the first tab portion 24, and the step of breaching the second breachable bubble 22 may include separating a second sealed portion 50 of the first film 11 and the second film 12 to form a second breach passage 52 between the second tab portion 26 and the package periphery 18. Further, in certain exemplary embodiments, as discussed above, the steps of breaching the first breachable bubble 20 and breaching the second breachable bubble 22 may occur simultaneously.

The method may further include the step of causing the first tab portion 24 and the second tab portion 26 to shift from the first position to a second position in fluid communication with each other. For example, as discussed above, an adhesive layer 70 and/or male and female fasteners 74, 76 may releasably secure the portion of the second film 12 defined by the second tab portion 26 to the portion of the second film 12 defined by the first tab portion 24 when the first film 11 and the second film 12 are in the first position. During the process of opening the package 10 of the present disclosure, a user may, for example, rub the tab area 16, such as the tab portions 24 and 26, between the user's thumb and forefingers when the package 10 is in the first position. In exemplary embodiments, this slight manipulation may be sufficient to break the bond of the adhesive layer 70 or separate the male fastener 74 from the female fastener 76 and separate the various portions of the film layer 12, thus causing the first tab portion 24 and the second tab portion 26 to shift from the first position to the second position. Alternatively, the user may pull or peel the various portions of the film layer 12 apart, or may separate the various portions using any known separation technique.

As discussed above, in the first position, the first film 11 and the second film 12 may be folded such that the portion of the second film 12 defined by the second tab portion 26 is disposed adjacent and releasably secured to the portion of the second film 12 defined by the first tab portion 24. Further, as discussed above, in the second position, the portion of the second film 12 defined by the second tab portion 26 may be released from the portion of the second film 12 defined by the first tab portion 24.

The package 10 of the present method may include a first film 11 and a second film 12, as discussed above. The first film 11 and the second film 12 may form an enclosure 14 and the at least one tab area 16, and may define a package periphery 18. The enclosure 14 may define an interior volume 15 configured to receive a product 80.

In exemplary embodiments, the package 10 may further include a barrier 32 disposed in the at least one tab area 16. The barrier 32 may divide the tab area 16 into the first tab portion 24 and the second tab portion 26. The barrier 32 may define a barrier passage 34 therethrough, as discussed above.

Figure 13:
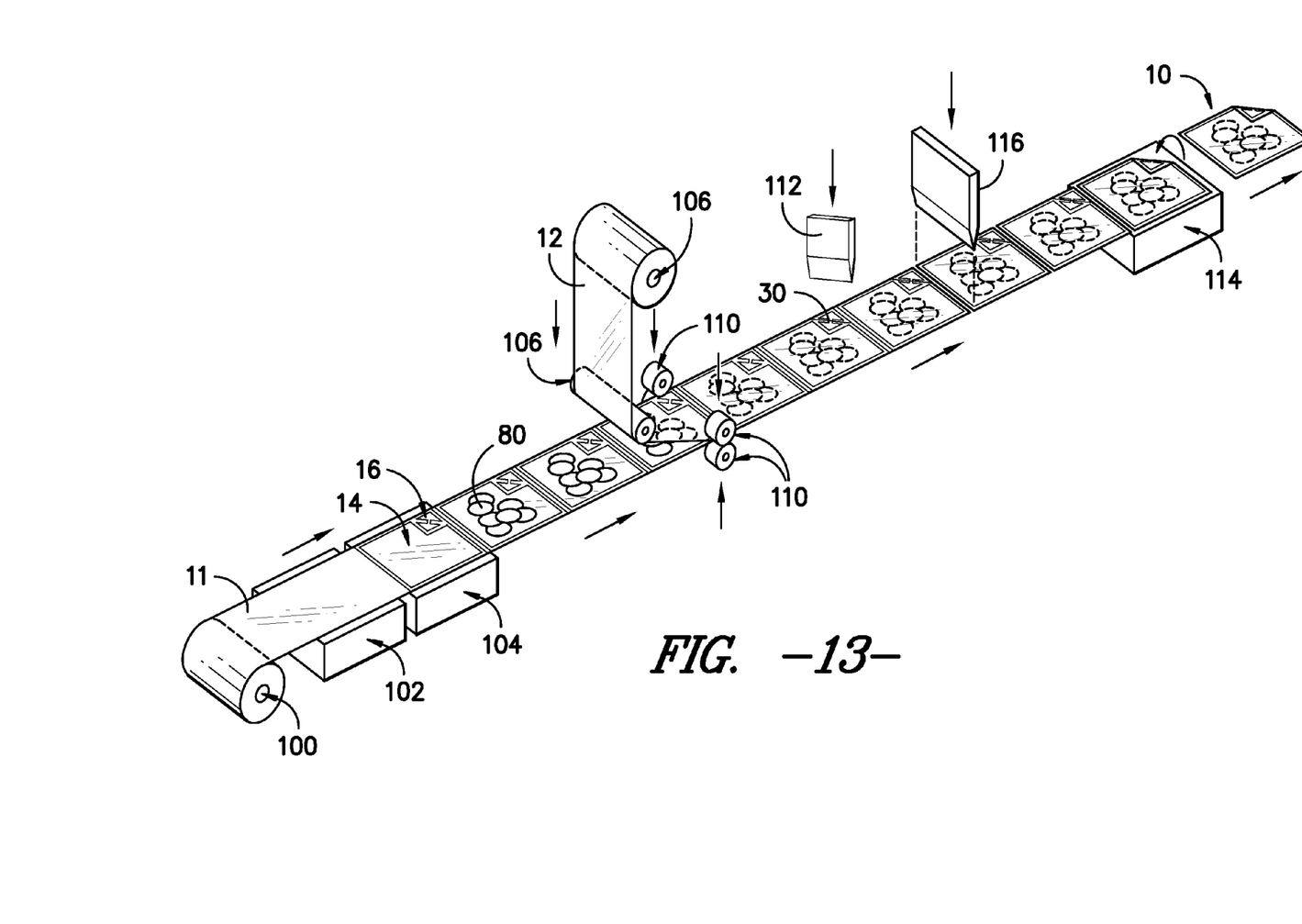
FIG. 13 is a perspective view of one embodiment of a process of the present disclosure.

The present disclosure is also directed to a process for forming a package 10. For example, referring now to FIG. 13, the process includes providing a first film 11. The first film 11 may be provided from any suitable source, such as from a spool 100 or spools 100 of the first film 11, as shown in FIG. 13, or from a stack of first films 11 or another suitable source. Further, the first film 11 may be provided automatically, such as through an automated system which may be controlled by, for example, a processor, or the first film 11 may be provided manually.

The process may further include the step of, for example, forming an enclosure 14 and at least one tab area 16 in the first film 11. As discussed above, the enclosure 14 may define an interior volume 15 configured to receive a product 80. Further, as discussed above, in some embodiments, the at least one tab area 16 may include a first tab portion 24 and a second tab portion 26.

The forming step may, in general, be performed by any suitable forming apparatus. For example, in one embodiment, the forming step includes vacuum forming the enclosure 14 and the at least one tab area 16. Further the forming step may include heating the first film 11. For example, the enclosure 14 and at least one tab area 16 may be formed through heating and then vacuum forming. In one embodiment, as shown in FIG. 13, a heating element 102 may heat the first film 11, and a vacuum element 104 may then vacuum form the enclosure 14 and the at least one tab area 16. In alternative embodiments, the forming step may be performed by stamping, drawing, or any other suitable forming process. The forming step may be performed automatically, such as through an automated system which may be controlled by, for example, a processor, or may be performed manually.

In some embodiments, the forming step may further include, for example, forming a barrier 32. The barrier 32 may be formed by vacuum forming, heating, stamping, drawing, or any other suitable forming process, as discussed above. The barrier 32 may be disposed in the at least one tab area 16, as discussed above, and may divide the at least one tab area 32 into the first tab portion 24 and the second tab portion 26. Further, the barrier 32 may, as discussed above, define a barrier passage 34 therethrough.

The process may further include the step of, for example, introducing a fluid into the at least one tab area 16. In some embodiments, the fluid may be introduced into one or both of the first tab portion 24 and the second tab portion 26. The fluid, as discussed above, may be a liquid or a gas, and in one embodiment may be air. In some embodiments, the introducing step may be fulfilled by simply allowing ambient fluid, such as ambient air, to be contained within the at least one tab area 16. In alternative embodiments, any suitable devices, such as fans, hoses, or other suitable fluid communication devices, may be utilized to introduce the fluid into the at least one tab area 16. The introducing step may be performed automatically, such as through an automated system which may be controlled by, for example, a processor, or may be performed manually.

The process may further include the step of, for example, introducing a product 80 into the enclosure 14. The product 80 may be any suitable product, such as, in some embodiments, a consumer product. The introducing step may be fulfilled by placing or otherwise providing product 80 into the enclosure. The introducing step may be performed automatically, such as through an automated system which may be controlled by, for example, a processor, or may be performed manually.

In some embodiments, the process may further include the step of, for example, evacuating the enclosure 14. For example, ambient air, other fluids, and/or contaminants in the enclosure 14 may be evacuated from the enclosure in order to, for example, sterilize the enclosure 14. Any suitable device, such as a vacuum device, may be utilized to evacuate the enclosure 14. Additionally or alternatively, the process may include the step of, for example, introducing a fluid into the enclosure 14. The fluid may be, for example, a suitable protective fluid designed to protect, preserve, and/or sterilize the enclosure 14 and/or the product 80 therein. Any suitable device, such as a fluid communication device as discussed above, may be utilized to introduce the fluid into the enclosure 14.

The process may further include the step of providing a second film 12 adjacent the first film 11. The second film 12 may be provided such that the second film 12 generally covers the enclosure 14 and the at least one tab area 16. For example, one continuous sheet of second film 12 may cover the enclosure 14 and the at least one tab area 16, or separate sheets of second film 12 may cover the enclosure and at least one tab area 16 or various portions thereof. The second film 12 may be provided from any suitable source, such as from a spool 106 or spools 106 of the second film 12, as shown in FIG. 13, or from a stack of second films 12 or another suitable source. Further, the second film 12 may be provided automatically, such as through an automated system which may be controlled by, for example, a processor, or the second film 12 may be provided manually.

The process may further include the step of sealing the first film 11 and the second film 12 together to define a package periphery 18 and form at least one breachable bubble in the at least one tab area 16. In some embodiments, the sealing step includes applying heat to the first film 11 and the second film 12 and applying pressure to the first film 11 and the second film 12. For example, in some embodiments as shown in FIG. 13, suitable sealing devices 110 may be utilized to apply pressure and/or heat to the films 11, 12. In alternative embodiments, the sealing step includes applying an adhesive, such as adhesive layer 72, between the first film 11 and the second film 12 and applying pressure to the first film 11 and the second film 12. Further, any other suitable sealing technique may be utilized to seal the first film 11 and the second film 12 together.

As discussed above, upon sealing, sufficient fluid is trapped within the at least one breachable bubble such that, upon application of pressure by a user to the at least one tab area 16, the breachable bubble breaches, separating a sealed portion of the first film 11 from the second film 12. Further, in some embodiments, sealing the first film 11 and the second film 12 together forms a first breachable bubble 20 within the first tab portion 24 of the at least one tab area 16 and a second breachable bubble 22 within the second tab portion 26 of the at least one tab area 16. In these embodiments, upon sealing, sufficient fluid is trapped within the first breachable bubble 20 such that, upon application of pressure by a user to the at least one tab area 16, the first breachable bubble breaches 20, separating a first sealed portion 40 of the first film 11 and the second film 12 to form a first breach passage 42 between the enclosure 14 and the first tab portion 24. Further, sufficient fluid is trapped within the second breachable bubble 22 such that, upon application of pressure by a user to the at least one tab area 16, the second breachable bubble 22 breaches, separating a second sealed portion 50 of the first film 11 and the second film 12 to form a second breach passage 52 between the second tab portion 26 and the package periphery 18.

In some embodiments, the process may further include the step of defining a fold line 30 in the first film 11 and/or the second film 12. In exemplary embodiments, the fold line 30 may define the first tab portion 24 and the second tab portion 26. As discussed above, the fold line 30 may generally be a crease in the first film 11 and/or the second film 12. In some embodiments, as shown in FIG. 13, a creasing device 112 may be utilized to define the fold line 30. The creasing device 112 may, for example, include a blade or punch configured to create the fold line 30 by pressing or otherwise engaging the first film 11 and/or the second film 12. Alternatively, the creasing device 112 may be a device configured to fold the first film 11 and/or the second film 12 at a suitable location to create the fold line 30, or may be any suitable device for defining a fold line 30. The creasing device 112 may be operated automatically, such as through an automated system which may be controlled by, for example, a processor, or may be operated manually. In alternative embodiments, the fold line 30 may be defined by, for example, a human operator simply folding the first film 11 and/or the second film 12 at a suitable location to create the fold line 30.

In some embodiments, the process may further include folding the first film 11 and the second film 12 to a first position. As discussed above, in the first position, the first tab portion 24 and the second tab portion 26 are substantially sealed from each other to facilitate breaching, while in a second position, the first tab portion 24 and the second tab portion 26 are in fluid communication with each other. In some embodiments, as shown in FIG. 13, a folding device 114 may be utilized to fold the first film 11 and the second film 12. The folding device 114 may, for example, may be any device configured to fold the first film 11 and/or the second film 12 at a suitable location, such as at the fold line 30. The folding device 114 may be operated automatically, such as through an automated system which may be controlled by, for example, a processor, or may be operated manually. In alternative embodiments, a human operator may simply fold the first film 11 and the second film 12 at a suitable location, such as at the fold line 30.

As discussed above, in some exemplary embodiments, the first film 11 and the second film 12 in the first position may be folded such that the portion of the second film 12 defined by the second tab portion 26 is disposed adjacent and releasably secured to the portion of the second film 12 defined by the first tab portion 24. Additionally, in some exemplary embodiments as discussed above, in the second position the portion of the second film 12 defined by the second tab portion 26 may be released from the portion of the second film 12 defined by the first tab portion 24.

Further, in exemplary embodiments as discussed above, upon application of pressure by a user to the at least one tab area 16, the first breachable bubble 20 and the second breachable bubble 22 are breached substantially simultaneously.

In some embodiments, the process may further include separating the package 10. For example, the first film 11 and the second film 12 may be utilized to create multiple rows and columns of packages 10, as shown in FIG. 13. After a package 10 is formed according to the present disclosure, the package 10 may be separated from the remaining packages 10 being formed or already formed. In some embodiments, for example, a separation device 116 may separate the package 10. The separation device 116 may be, for example, a blade or other suitable device for separating the package 10. The separation device 116 may be operated automatically, such as through an automated system which may be controlled by, for example, a processor, or may be operated manually.

Various of the above-disclosed steps may be performed by a variety of commercially-available packaging devices. For example, steps including but not limited to providing the first film 11, forming the enclosure 14 and at least one tab area 16, introducing a fluid into the at least one tab area 16, providing the second film 12 adjacent the first film 11, and/or sealing the first film 11 and the second film 12 together, may be performed by various commercially-available packaging devices configured to perform the steps. Examples of such commercially-available devices include, but are not limited to, packaging devices by BOSCH PACKAGING TECHNOLOGY (a subsidiary of ROBERT BOSCH GmbH), BOSSAR PACKAGING, CFS B.V., HAYSSENSANDIACRE, KLIKLOK-WOODMAN, MULTIVAC INC., and VC999 PACKAGING SYSTEMS AG.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for opening a package comprising:
    applying pressure to at least one tab area of the package, the at least one tab area including a first tab portion and a second tab portion, the first tab portion and the second tab portion being disposed in a first position substantially sealed from each other;
    breaching a first breachable bubble, the first breachable bubble being formed within the first tab portion;
    breaching a second breachable bubble, the second breachable bubble being formed within the second tab portion, the first breachable bubble and the second breachable bubble being portions of a singular breachable bubble and wherein breaching the second breachable bubble opens a breach passage between the tab area and the package periphery; and
    causing the first tab portion and the second tab portion to shift from the first position to a second position in fluid communication with each other,
    wherein the package comprises a first film and a second film, the first film and the second film forming an enclosure and the at least one tab area and defining a package periphery, the enclosure defining an interior volume configured to receive a product.

2. The method of claim 1, wherein the steps of breaching the first breachable bubble and breaching the second breachable bubble occur substantially simultaneously.

3. The method of claim 1, wherein breaching the first breachable bubble comprises separating a first sealed portion of the first film and the second film to form a first breach passage between the enclosure and the first tab portion, and wherein breaching the second breachable bubble comprises separating a second sealed portion of the first film and the second film to form the breach passage between the second tab portion and the package periphery.

4. The method of claim 1, wherein in the first position, the first film and the second film are folded such that the portion of the second film defined by the second tab portion is disposed adjacent and releasably secured to the portion of the second film defined by the first tab portion, and wherein in the second position, the portion of the second film defined by the second tab portion is released from the portion of the second film defined by the first tab portion.

5. The method of claim 1, wherein the package further comprises a barrier disposed in the at least one tab area and dividing the at least one tab area into the first tab portion and the second tab portion, the barrier defining a barrier passage therethrough.

6. A method for opening a package comprising a first film and a second film, the first film and the second film forming an enclosure and the at least one tab area and defining a package periphery, the enclosure defining an interior volume configured to receive a product, the at least one tab area including a first tab portion having a first breachable bubble formed within the first tab portion, and a second tab portion having a breachable bubble formed within the second tab portion, the first tab portion and the second tab portion being disposed in a first position substantially sealed from each other comprising:
    breaching said first breachable bubble;
    breaching said second breachable bubble and wherein breaching the second breachable bubble opens a breach passage between the tab area and the package periphery; and
    causing the first tab portion and the second tab portion to shift from the first position to a second position wherein said first and second tab portions are in fluid communication with each other.

7. The method of claim 6, wherein the steps of breaching the first breachable bubble and breaching the second breachable bubble occur substantially simultaneously.

8. The method of claim 6, wherein breaching the first breachable bubble comprises separating a first sealed portion of the first film and the second film to form a first breach passage between the enclosure and the first tab portion, and wherein breaching the second breachable bubble comprises separating a second sealed portion of the first film and the second film to form the breach passage between the second tab portion and the package periphery.

9. The method of claim 6, wherein in the first position, the first film and the second film are folded such that the portion of the second film defined by the second tab portion is disposed adjacent and releasably secured to the portion of the second film defined by the first tab portion, and wherein in the second position, the portion of the second film defined by the second tab portion is released from the portion of the second film defined by the first tab portion.

10. The method of claim 6, wherein the package further comprises a barrier disposed in the at least one tab area and dividing the at least one tab area into the first tab portion and the second tab portion, the barrier defining a barrier passage therethrough.

11. A method as defined in claim 1, wherein in a first folded position, the first tab portion and the second tab portion are substantially sealed from each other to facilitate breaching, and in a second unfolded position, the first tab portion and the second tab portion are in fluid communication with each other.

12. A method as defined in claim 1, wherein in a first position, the first film and the second film are folded such that the first breachable bubble is separated from the second breachable bubble along a fold line.

13. A method as defined in claim 12 wherein the first breachable bubble and the second breachable bubble are only separated by the fold line.

14. A method as defined in claim 12, wherein only the fold line separates the first breachable bubble from the second breachable bubble and the first breachable bubble is not separated from the second breachable bubble by any other barrier or seal.

15. A method as defined in claim 11, wherein, in the second unfolded position, the first tab portion and the second tab portion are in fluid communication with each other even though the first and second breachable bubbles have not been breached.

16. A method as defined in claim 6, wherein the first breachable bubble and the second breachable bubble are portions of a singular breachable bubble, and wherein, in the first position, the second breachable bubble is folded over onto the first breachable bubble and, wherein, in the second position, the second breachable bubble is unfolded from the first breathable bubble.

17. A method as defined in claim 16, wherein the first breachable bubble and the second breachable bubble are only separated by a fold line, such that when placed in the second position, the first breachable bubble and the second breachable bubble are in fluid communication with the each other.

\* \* \* \* \*